United States Patent [19]
Myers

[11] Patent Number: 6,120,070
[45] Date of Patent: Sep. 19, 2000

[54] LOCKABLE PANEL LATCH

[75] Inventor: Norbert W. Myers, Perryville, Mo.

[73] Assignee: Sabreliner Corporation, St. Louis, Mo.

[21] Appl. No.: 09/258,524

[22] Filed: Feb. 26, 1999

[51] Int. Cl.$^7$ ............................................. E05C 1/08
[52] U.S. Cl. ........................... 292/163; 292/153; 292/254
[58] Field of Search ................................... 292/175, 168, 292/164, 163, 174, 153, 254, DIG. 11

[56] References Cited

U.S. PATENT DOCUMENTS

| | | | |
|---|---|---|---|
| 478,104 | 7/1892 | Hathaway | 292/153 |
| 919,750 | 4/1909 | Neumeister | 292/153 |
| 937,348 | 10/1909 | Wheelock | 292/175 |
| 1,689,101 | 10/1928 | Beck | 292/175 |
| 2,591,647 | 4/1952 | Welch | 292/153 |
| 2,593,247 | 4/1952 | Benteman | 292/175 |
| 3,626,507 | 12/1971 | Hawkins | 292/175 |
| 5,713,227 | 2/1998 | Turnbo | 70/144 |

*Primary Examiner*—B. Dayoan
*Assistant Examiner*—John B. Walsh
*Attorney, Agent, or Firm*—Howell & Haferkamp, LC

[57] ABSTRACT

A latch for use in connecting thin panels together has a base with first and second portions connected by a spring loaded hinge, a lock pin and release pin mounted to the base reciprocate relative to the first and second portions of the base. The first and second portions of the base are moveable relative to one another with the second portion of the base having an edge to engage an enlarged head of the distal end of the lock pin and holding the lock pin in a retracted position. A spring biased release pin contacts the second portion of the base and disengages the enlarged head of the lock pin from the second portion of the base, and a biasing spring returns the lock pin into a locked position where it secures a second panel member to a first panel on which the latch is attached. The lock pin and the release pin are operated by a simple hand tool that cooperates with complementary receptacles on the pins to move the pins along their longitudinal axes in response to an axial force applied by the tool.

11 Claims, 4 Drawing Sheets

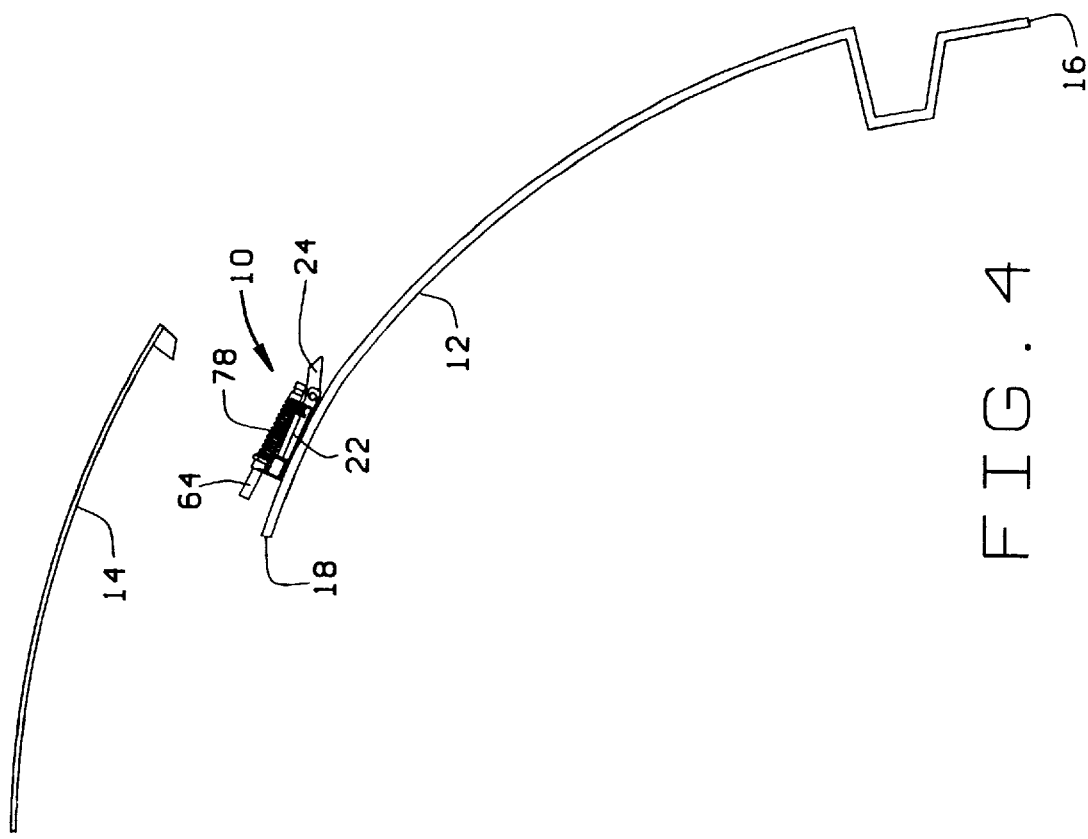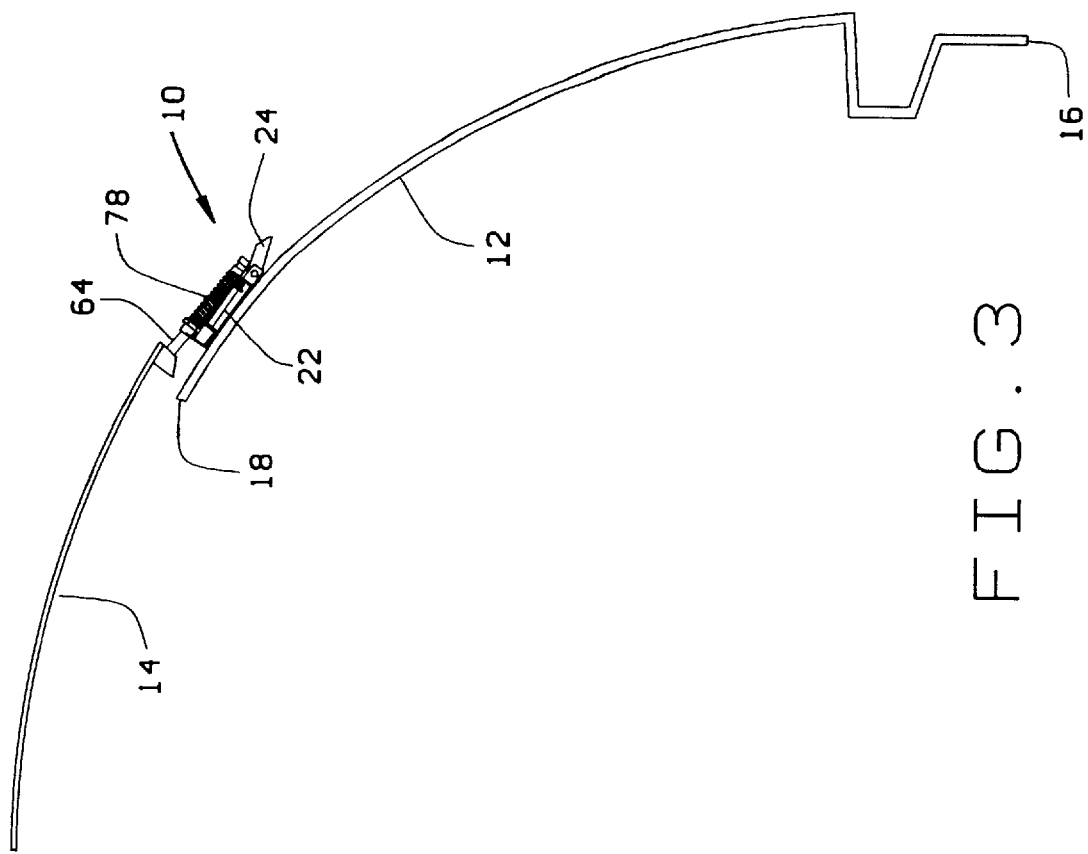

LOCKABLE PANEL LATCH

BACKGROUND OF THE INVENTION

This invention relates to latches for attaching multiple panels together in general, and specifically to a latch assembly especially suited for securing interior panel members of an airplane to one another.

Latches have been used for centuries to lockably attach paneled enclosures. Latches may be found on doors, cupboards, fences, and a wide variety of other enclosures constructed of multiple panel members. In many of these traditional applications, latches are used to attach a panel having opposite flat surfaces to a frame. As such, the operator of the latch usually has clear access to one of the flat surfaces of the panel where a knob, lever, or other mechanical linkage may be easily manipulated to lock or unlock the latch, and hence the panel(s) secured by the latch.

Another type of popular latch typically used in fence construction is the use of a mechanical linkage to directly attach two similar panel members together. Much like conventional door latches, an operator of this type of latch usually has unobstructed access to the latch to lock it and unlock it.

While these types of latches function adequately in traditional settings, they are not desirable when the latch between two panels is to be concealed from view for aesthetic reasons. Also, they are ill equipped to be used with curved panels, especially when the panels are joined in an overhead fashion, such as the interior of airplanes and other vehicles. These types of panels are commonly used for aesthetic and safety reasons in such vehicles. The panels form an inner skin to cover mechanical and electrical component systems while still providing access to these components for maintenance.

Because of the obvious danger that would ensue from these types of panels falling down on unsuspecting occupants, panel members are often bolted down in airplanes. However, from time to time it is necessary to remove the panels to maintain and/or repair the aircraft systems underneath. To facilitate access to areas behind them, the panels are commonly hinged on one end and bolted on the other so that when the bolts are removed, the panels rotate on their hinges and reveal the systems underneath for maintenance and repair.

This construction is disadvantaged, however, in several respects. For example, the bolts take some time to fully engage and disengage. The bolts are also subject to being dropped or lost, especially in the context of an airplane interior where the bolts are located in an overhead position. Finally, holding a large panel in place while at the same time bolting it down can be a difficult job for one repair person to accomplish. Where multiple bolts are required, these problems only increase.

A latch assembly would be one way to avoid these problems and provide quick and easy access to areas behind the panels, but conventional latches suffer from a number of disadvantages which makes their use impractical if not infeasible. For example, conventional knobs, levers, and the like located on an overhead interior panel of an airplane would considerably detract from the appearance of the aircraft interior and perhaps create hazards for taller passengers and workers. Moreover, these devices would likely be subject to being accidentally opened from incidental or inadvertent contact. Also, these types of latches may reveal critical points of access to airplane systems that would preferably be concealed for security reasons. While traditional locks could be used to alleviate some of these concerns, additional security and administrative problems would be incurred regarding the whereabouts of keys to the various locks for multiple panels.

Furthermore, most traditional latches are incompatible for overhead use in joining interior panels of airplanes. Most traditional latches are designed for joining flat, vertically oriented panels to each other or to a frame with a horizontally actuated latch. Consequently, the resultant play between the panels may result in unacceptable rattles if used on airplanes in an overhead fashion. Gravitational and accelerative forces typically generated in flight also militate against using traditional latches on overhead airplane panels.

Thus, the prior art has failed to provide an aesthetically pleasing, simple and secure latch assembly that is generally immune from accidental actuation and that is suitable for use in an overhead environment.

SUMMARY OF THE INVENTION

Among the several advantages of the present invention may be noted the provision of an aesthetically pleasing hideaway latch to secure panel members together; the provision of a latch that is quickly and easily locked, unlocked and manipulated by a single repair person; the provision of a latch that is operable in limited access areas; the provision of a latch that securely locks panel members together and prevents accidental opening of the panels; and the provision of a latch that securely unlocks in a retracted position conducive to a safer work environment around disengaged panels.

Generally, the present invention comprises a mounting base having first and second portions connected together by a coil spring loaded pivot hinge, a lock pin mounted on the base first portion for reciprocating movement relative to the base, and a release pin also mounted on the base first portion for reciprocating movement relative to the base. The latch is mounted on a first panel adjacent an edge of the first panel. The latch has two operating positions when mounted to a panel: an extended locked position and a retracted unlocked position. In the locked position, a distal end of the lock pin is biased by a spring to extend beyond the first portion of the base and engage a locking hole or a locking ledge in an adjacent second panel. Therefore, the adjacent second panel is firmly secured to the first panel to which the latch is attached.

The latch may be unlocked with a simple tool that engages a receptacle in the distal end of the lock pin. By applying an axial force to the lock pin with the tool, the lock pin is moved against the bias of its spring in a longitudinal direction toward the second portion of the base, which is inclined relative to the first portion of the base. When the proximal end of the lock pin contacts the inclined surface of the base second portion, the coil spring loaded hinge connecting the first and second portions of the base allows the second portion to move relative to the first portion against the bias of the coil spring. Thus, the angle of inclination between the first and second portions of the base is changed by the contact of the lock pin with the inclined surface of the base second portion. The inclined surface of the base second portion rotates around its coil spring loaded hinge in response to the contact of the lock pin until an enlarged head at the proximal end of the lock pin clears a leading edge of the base second portion. Once the head of the lock pin clears the leading edge of the base second portion, the coil spring loaded hinge connecting the first and second portions causes the second portion to snap back and engage a neck of the lock pin adjacent the enlarged head.

When the force of the tool is removed from the receptacle in the distal end of the lock pin, the spring surrounding the lock pin biases the lock pin toward its extended lock position. With the head of the lock pin engaging with the leading edge of the base second portion, the lock pin is held in its retracted unlocked position against the bias of the lock pin spring. As such, the lock pin and the base second portion are firmly locked together, placing the lock pin in a retracted position relative to the locking hole or ledge of the adjacent second panel member. Therefore, the panels may be disengaged.

To lock the panels together again, the panels are positioned relative to each other so that the lock pin distal end on the first panel is adjacent the locking hole or ledge on the second panel. The tool is then inserted into a receptacle on a distal end of the release pin. An axial force is applied to the release pin through the tool against a biasing spring of the release pin. Thus, the release pin is moved in a longitudinal direction toward the base second portion. As the release pin contacts the base second portion, it rotates the second portion against the bias of the coil spring and changes the angle of inclination between the first and second portions of the base. As the release pin continues its travel in a direction toward the second portion of the base, it forces the inclined surface of the base second portion downward until its leading edge disengages from the enlarged head of the lock pin. At that point, the biasing spring of the lock pin moves the lock pin in a longitudinal direction away from the base second portion and toward its extended locked position in the lock hole or over the lock ledge of the adjacent second panel member. The coil spring of the base second portion biases the second portion against the end of the release pin. Therefore, the adjacent panel members are once again secured together.

The tool used to operate the latch is simply a shaft with a handle that facilitates the application of an axial force to the ends of the respective lock and release pins. A variety of configurations of the tool may be used to operate the latch in various conditions. In particular, a bent shaft has been found particularly useful in the context of airplane interior panels. The bent shaft of the tool compensates for the curvature of the airplane panels and allows easy operation of the latch.

Therefore, the latch of the present invention is aesthetically advantageous because it is practically invisible in use. Coupled with the simplicity of its operation with the compatible tool, the latch provides an ideal locking device where aesthetic concerns and the configuration of panel members render conventional latches impractical. The latch may be quickly and easily manipulated by a single person with the proper tool. Because the latch of the present invention is locked and unlocked by actuating the longitudinal ends of the lock pin and release pin with the tool, the latch is almost immune from accidental unlocking through inadvertent contact.

Finally, as the lock pin firmly locks against the leading edge of the base second portion when in its retracted position relative to the base first portion, the lock pin is safely tucked away behind the first panel and a relatively unobstructed working environment around the panels results. Thus, snags and the associated safety risks of a protruding lock pin are avoided.

Other objects and features of the invention will be in part apparent and in part pointed out hereinafter.

BRIEF DESCRIPTION OF THE DRAWINGS

FIG. 3 is a side elevation view of the latch of the present invention in a locked position joining two panels.

FIG. 4 is a side elevation view similar to FIG. 3, but showing the latch in the unlocked position and the panels separated.

Corresponding reference characters indicate corresponding parts throughout the several views of the drawings.

DESCRIPTION OF THE PREFERRED EMBODIMENT

Figure 1:
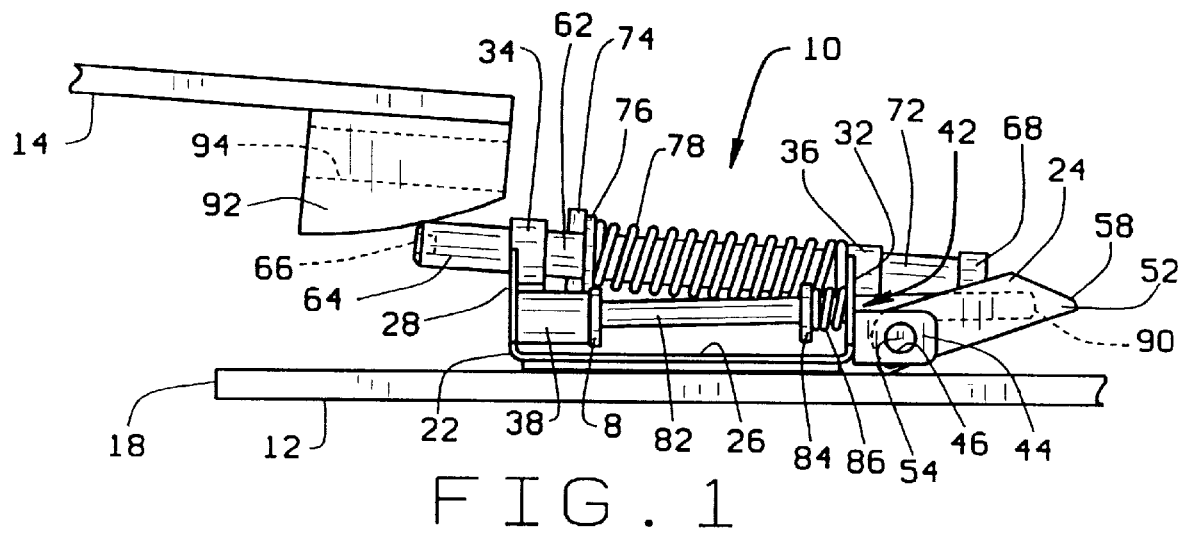
FIG. 1 is an elevational view of a latch according to the present invention connected to adjoining panel members.

Referring to the drawings, the latch of the present invention is shown in FIG. 1 and is generally designated by the reference numeral 10. The component parts of the latch are preferably constructed of metal for strength, but other similar types of materials may be employed. The latch 10 is attached to a first panel member 12 and functions to join the first panel 12 to an adjacent second panel member 14.

Figure 2:
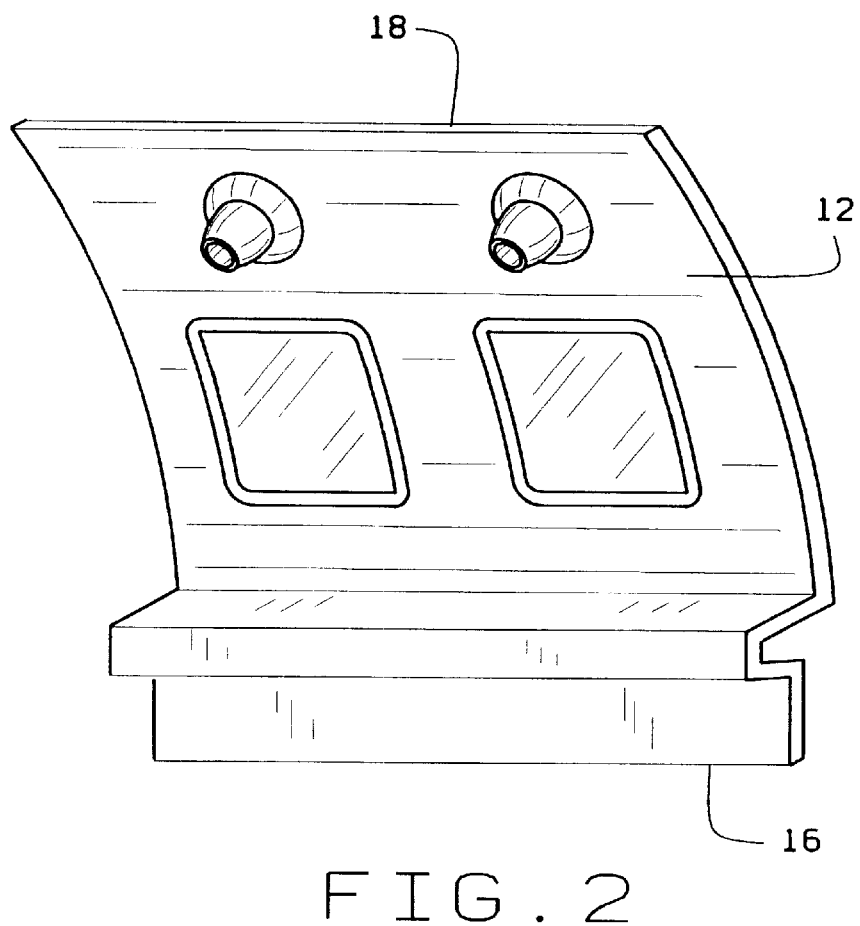
FIG. 2 is a perspective view of a typical airplane interior panel for which the latch of the present invention is especially well-suited.

Referring now to FIG. 2, the advantages of the latch 10 of the instant invention are demonstrated in the use of the latch to join interior panels of aircraft. Thin lightweight composite panels are used to form an interior skin of most aircraft. These types of panels cover the various control system elements used in the aircraft, insulate the aircraft, add an extra layer of protection to occupants of the airplane, and make the cabin of the airplane more aesethicaly pleasing. In most passenger aircraft, the panels incorporate window coverings and light fixtures, as well as other accessories and features desirable in the interior of an aircraft, such as air vents, speaker systems, and other amenities known in the art.

As is shown in FIG. 2, a side panel 12 is generally arcuate due to the shape of the fuselage of the aircraft, and somewhat oddly shaped due to design considerations not pertinent for purposes of this discussion. However, the shape of the side panel 12 does have some bearing on how like panels are attached together, which is complicated by the necessity to access the systems behind the panel 12 for maintenance and repair purposes. To facilitate this access behind the side panel 12, the panel is often hinged at a lower end 16 and attached to an overhead panel 14 along the top edge 18 of the side panel 12. Therefore, when the side panel 12 is disengaged from the overhead panel 14 , the side panel 12 may pivot about its lower end 16 and the area behind the panel may be accessed.

It is to be understood that although the remainder of this discussion of the invention is in the context of its use in connecting aircraft interior panels, it is recognized that the benefits of the invention accrue to paneled systems in general. Therefore, the use of the latch in the context of an aircraft interior is for illustrative purposes only, and nothing in this application is intended to restrict the practice of the invention to the connection of aircraft interior panels.

Figure 6:
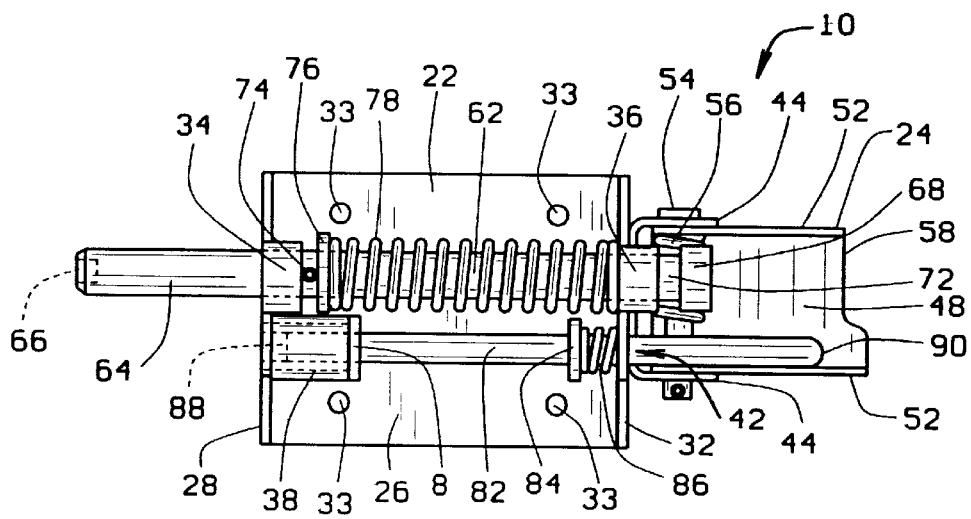
FIG. 6 is a top plan view of the latch of the present invention in a locked position.
Figure 7:
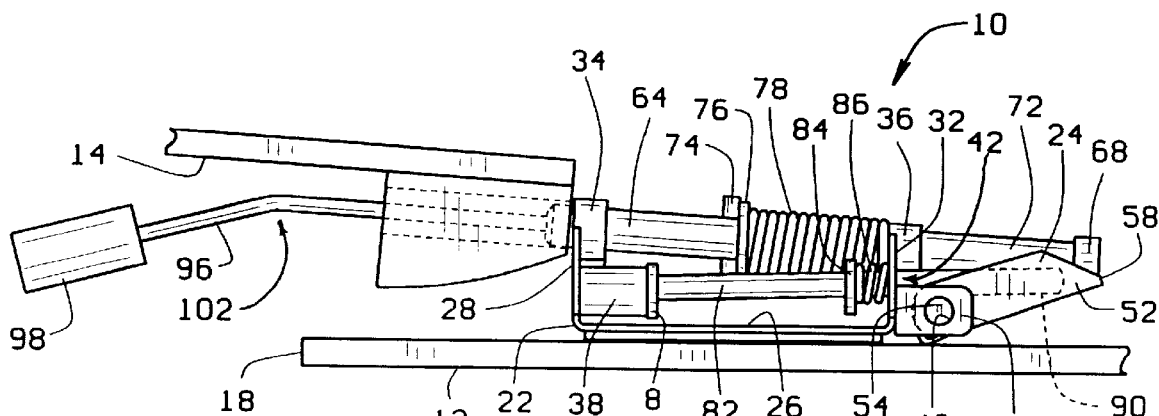
FIG. 7 is an elevational view of the latch of the present invention attached to panel members and illustrating the unlocking of the latch with the tool of FIG. 5.

Referring back to FIG. 1, the latch 10 includes a base comprised of a base first portion 22 and a base second portion 24. The base first portion 22 is formed from a flat strip of metal and has a flat intermediate section that functions as a bottom surface 26 of the base first portion and upwardly bent opposite distal 28 and proximal 32 ends that function as brackets of the base first portion. Referring to FIG. 6 it can be seen that the bottom surface 26 of the base is provided with four apertures 33 that receive fasteners in attaching the base first portion to an interior surface of the side panel 12. A pair of annular collars 34, 36 are supported on the base first portion. A distal annular collar 34 is supported on the distal bracket 28 and a proximal annular collar 36 is supported on the proximal bracket 32. These two collars 34, 36 have interior bores passing therethrough that are substantially equal in size and are coaxial. A cylindrical sleeve 38 is also secured to the distal bracket 28 to one side of and slightly below the distal collar 34. The cylindrical sleeve 38 has an interior bore passing therethrough that is aligned with a hole (not shown) through the distal bracket 28. A hole 42 also passes through the proximal bracket 32 of the base first portion. The hole 42 has a center axis that is coaxial with a center axis of the interior bore of the cylindrical sleeve 38. A U-shaped piece is secured to the proximal bracket 32 of the base first portion and defines a pair of spaced arms 44. A pair of coaxial holes 46 pass through the arms 44.

The base second portion 24 is secured to the base first portion 22 between the pair of arms 44. The base second portion 24 has a generally U-shaped cross-section with a bottom wall 48 and upstanding side walls 52. The second portion side walls 52 have coaxial holes passing therethrough that align with the holes 46 of the base first portion arms 44. A pivot pin 54 passes through the holes of the base first portion arms 44 and the base second portion side walls 52, thus connecting the base first portion 22 and second portion 24 together for relative pivoting movement. A coil spring 56 is mounted on the pivot pin 54 and biases the base second portion 24 to pivot toward the base first portion 22 in a counterclockwise direction as viewed in FIG. 1. Opposite the pivot pin 54, the base second portion 24 has a leading edge 58 that extends across the bottom wall 48 between the pair of upstanding side walls 52.

A lock pin 62 is received in the pair of annular collars 34, 36 of the base first portion 22 for reciprocating movement therethrough. The lock pin 62 has a cylindrical exterior surface that is dimensioned to slide easily through the pair of collars 32, 36. A distal end 64 of the lock pin projects outwardly from the distal collar 34. The lock pin distal end 34 has a tool recess 66 in its end surface. The opposite proximal end of the lock pin has an enlarged head 64 formed thereon. The head 68 is cylindrical and extends completely around the lock pin proximal end 72 which defines a necked down surface of the lock pin adjacent the head 68. A pin 74 passes through the lock pin and limits the extent to which the lock pin distal end 64 can project from the bracket distal collar 34. As shown in FIG. 6, the lock pin 62 is positioned in its extended, lock position with the pin 74 engaging against the distal collar 34. A circular washer 76 is mounted over the lock pin 62 and engages against the pin 74 and a coil spring 78 is mounted on the lock pin 62 between the washer 76 and the proximal bracket 32 of the base first portion 22. As seen in FIG. 6, the lock pin spring 78 biases the lock pin 62 to its extended, lock position shown. Pushing the lock pin 62 to the right as shown in FIG. 6 will compress the lock pin spring 78 between the washer 76 and pin 74 and the base first portion proximal collar 36. The lock pin 62 is of a sufficient length to allow normal expansion and contraction of the airplane panels without disengaging the panels or jamming them together.

A release pin 82 is mounted in the cylindrical sleeve 38 of the distal bracket 28 and through the hole 42 in the proximal bracket 32. The release pin 82 has a cylindrical exterior surface that is dimensioned to reciprocate easily through the cylindrical sleeve 38 and the proximal bracket hole 42. The release pin has a circular flange 84 mounted stationary on the pin. A small coil spring 86 is also mounted on the release pin 82 between the flange 84 and the proximal bracket 32 of the base first portion 22. The spring 86 biases the release pin 82 to the left as viewed in the drawing figures. A second circular flange 85 on the release pin limits its movement to the left by engaging with the cylindrical sleeve 38. As shown in FIG. 6, the release pin 82 is in its at rest position relative to the base first and second portions 22, 24 with the release pin spring 86 not being compressed. A distal end 88 of the release pin is positioned in the cylindrical sleeve 38 and recessed behind the distal bracket 28 of the base first portion. The release pin proximal end 90 extends outwardly from the hole 42 in the proximal bracket 32 to a position adjacent the leading edge 58 of the bracket second portion 24.

The latch 10 cooperates with a block 92 having a locking hole 94 passing therethrough that is mounted to the second overhead panel 14. The locking hole 94 is dimensioned to easily receive the distal end 64 of the lock pin. The locking hole 94 of the block 92 functions by providing a surface for the distal end 64 of the lock pin to engage against when the lock pin is in its extended, locked position. Therefore, other structures such as a hook or ledge mounted on the overhead panel 14 could be employed for this same function.

Figure 5:
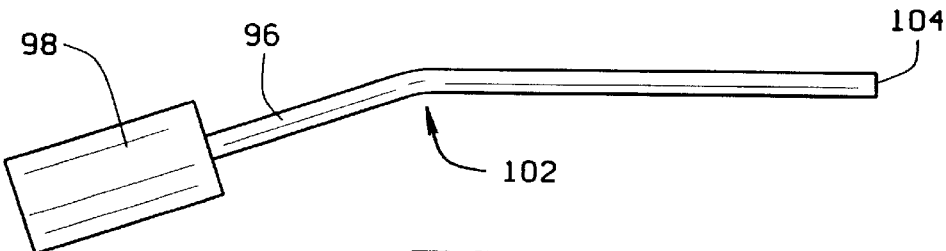
FIG. 5 is an elevational view of a tool used to operate the latch of the present invention.

A special tool shown in FIG. 5 is employed in operating the latch 10. The tool is basically comprised of an elongated cylindrical shaft or rod 96 with a cylindrical handle 98 at one end. A bend 102 is formed in an intermediate portion of the tool shaft 96. The bend 102 is provided to facilitate insertion of the tool distal end 104 between the spacing of the overhead panel 14 and side panel 12 as will be explained. The shaft distal end 104 is dimensioned to enable its insertion into the tool recess 66 in the lock pin distal end 64 and through the interior bore of the cylindrical sleeve 38 mounted on the distal bracket 28 of the base first portion.

Figure 8:
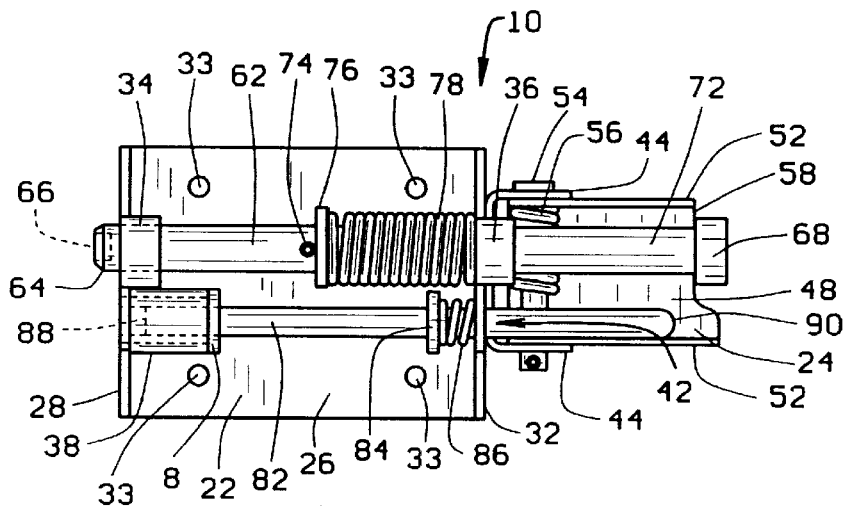
FIG. 8 is a top plan view of the latch of the present invention in an unlocked position.
Figure 9:
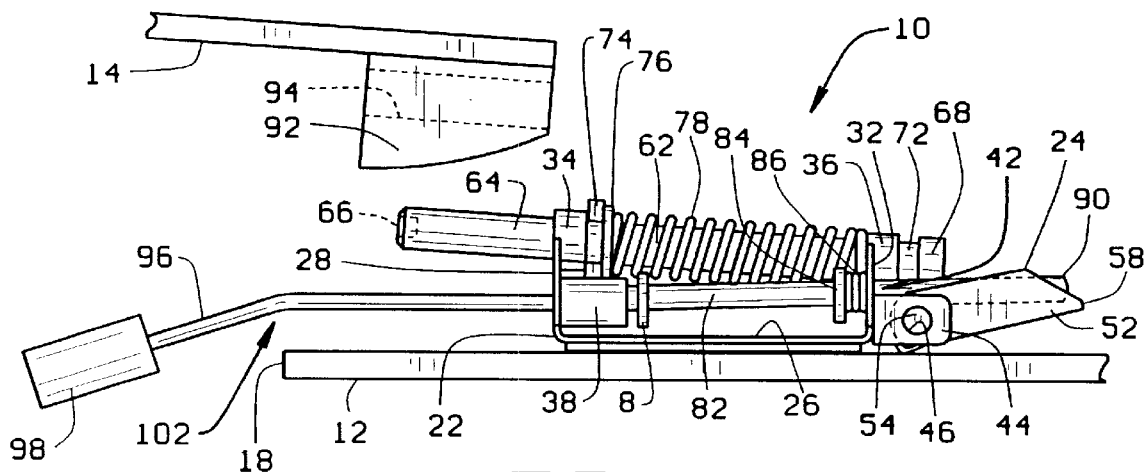
FIG. 9 is an elevational view of the latch of the present invention attached to panel members and illustrating the unlocking of the latch using the tool of FIG. 5.

In use of the latch 10 in connecting a side panel 12 to an overhead panel 14 as shown in FIG. 3, the latch first appears as shown in FIG. 6 with the lock pin 62 in its extended, locked position and the release pin 82 in its at rest position. The tool distal end 104 is first inserted into the tool recess 66 of the lock pin 62. Force is then exerted on the tool to cause the lock pin 62 to move to the right as shown in FIG. 6, compressing the lock pin spring 78. This movement of the lock pin will cause its enlarged proximal end head 68 to slide over the bottom wall 48 of the base second portion 24 causing the second portion 24 to pivot in a clockwise direction as shown in FIG. 1 against the bias of its coil spring 56. The movement of the lock pin 66 is continued until its enlarged proximal end head 68 passes over the leading edge 58 of the base second portion. This causes the base leading edge 58 to snap over the lock pin head 68 and engage against the necked down portion 72 of the lock pin proximal end adjacent the head 68. This position of the lock pin 68 relative to the base first portion 22 and second portion 24 is shown in FIG. 8. In FIG. 8, the lock pin 62 is shown in its retracted, unlocked position. The force on the tool is then removed allowing the lock pin spring 78 to bias the lock pin 62 toward its extended, locked position. However, the engagement of the leading edge 58 of the base second portion 24 with the lock pin head 68 prevents the lock pin from moving toward its extended, locked position under the bias of the lock pin spring 78.

With the lock pin 62 in its retracted position, the first side panel 12 can then be pivoted upwardly toward the second overhead panel 14. The two panels are positioned in their relative positions shown in FIG. 3 with the distal end 64 of the lock pin being aligned with the locking hole 94 of the block 92 on the overhead panel 14. The tool distal end 104 is then inserted into the interior bore of the cylindrical sleeve 38 of the base first portion distal bracket 28. The tool distal end 104 exerts a force against the distal end of the release pin causing the circular flange 84 of the release pin to compress the release pin spring 86. This results in movement of the release pin proximal end 90 across the bottom wall 48 of the base second portion 24, causing the base second portion 24 to pivot in a clockwise direction as viewed in FIG. 1 against the bias of its coil spring 56. As the pivoting movement of the base second portion 24 continues, the leading edge 58 of the base second portion disengages from the enlarged head 68 of the lock pin 62. This frees the lock pin 62 for movement toward its extended, locked position under the bias of its spring 78. This results in the distal end 64 of the lock pin 62 passing through the locking hole 94 of the block 92 on the second overhead panel 14, thus securing the first side panel 12 to the second overhead panel 14. With the two panels locked together, the force of the tool on the release pin 82 is released and the tool is removed from the cylindrical cylinder 38.

To unlock the two panels, the tool distal end 102 is inserted through the locking hole 94 of the block 92 and into the tool recess 66 of the lock pin 62. A force is then exerted on the lock pin in the same manner previously described causing it to move toward its retracted, unlocked position compressing the lock pin spring 78. The force is continued until the enlarged head 68 of the lock pin passes over the leading edge 58 of the base second portion which then holds the lock pin in its retracted, unlocked position as previously described. This movement of the lock pin retracts its distal end 64 out of the locking hole 94 of the block 92, thus unlocking the first side panel 12 from the second overhead panel 14 and enabling its downward pivoting movement.

Thus, the latch 10 of the present invention may be operated quickly and easily by a single repair person with the specialized tool shown in FIG. 5, or an equivalent tool such as a common pick. The latch provides a locking device where aesthetic concerns and the configuration of the panel members render conventional latches impractical. Because the specialized tool or similar tool is needed for the locking and unlocking operation of the latch, the latch is almost immune from accidental unlocking through inadvertent contact.

While the present invention has been described by reference to a specific embodiment, it should be understood that modifications and variations of the invention may be constructed without departing from the scope of the invention defined in the following claims.

What is claimed is:

1. A latch for securing multiple panel members, the latch comprising:

a mounting base having first and second portions, the second portion being moveable relative to the first portion, the second portion of the base having a locking edge; and a lock pin that is moveable relative to the first and second portions of the base between a locked position and an unlocked position, the lock pin being positioned relative to the base to lockably engage the lock pin with the second portion of the base when the lock pin is in the unlocked position and to separate the lock pin from the second portion of the base when the lock pin is in the locked position, the lock pin having an enlarged head that engages the locking edge of the second portion of the base when the lock pin is in the unlocked position.

2. The latch of claim 1, further comprising:

a lock spring, the lock spring biasing the lock pin toward the locked position.

3. A latch for securing multiple panel members, the latch comprising:

a mounting base having first and second portions, the second portion being moveable relative to the first portion;

a lock pin that is moveable relative to the first and second portions of the base between a locked position and an unlocked position, the lock pin being positioned relative to the base to lockably engage the lock pin with the second portion of the base when the lock pin is in the unlocked position and to separate the lock pin from the second portion of the base when the lock pin is in the locked position;

a release pin that is moveable relative to the first and second portions of the base between a catch position and a release position, the release pin being positioned relative to the base to contact the second portion of the base and separate the second portion of the base from the lock pin when the release pin is in the release position; and a base spring, the base spring biasing the second portion of the base toward contact with the release pin when the release pin is in the catch position.

4. The latch of claim 3 further comprising:

a release spring, the release spring biasing the release pin toward the catch position.

5. A latch for securing multiple panel members, the latch comprising:

a mounting base having a first surface and a second surface, one of the first and second surfaces being inclined at an angle of inclination relative to the other surface;

a lock pin slidably connected to the base, the lock pin being oriented to contact the inclined surface of the base, the lock pin also being moveable between a locked position and an unlocked position relative to the base and being separated from the first and second surfaces of the base when in the locked position; and a release pin slidably connected to the base, the release pin being oriented to contact the inclined surface of the base, the angle of inclination between the first and second surfaces being variable in response to the contact of the lock pin and the release pin with the inclined surface.

6. A latch for securing multiple panel members, the latch comprising:

a mounting base having a first surface and a second surface, one of the first and second surfaces being inclined at an angle of inclination relative to the other surface, the second surface having a locking edge;

a lock pin slidably connected to the base, the look pin being movable between a locked position and an unlocked position relative to the base, the lock pin also being oriented to contact the inclined surface of the base and to engage with the locking edge when the lock pin is in the unlocked position;

a release pin slidably connected to the base, the release pin being oriented to contact the inclined surface of the base, the angle of inclination between the first and second surfaces being variable in response to the contact of the lock pin and the release pin with the inclined surface.

7. The latch of claim 6 wherein:

the release pin is movable between a catch position and a release position relative to the base and the inclined surface of the base contacts the release pin when the release pin is in both the catch position and the release position.

8. The latch of claim 6, wherein:

the lock pin has an enlarged head that engages with the restraining edge, thereby locking the unlock pin in the locked position.

9. The latch of claim 6, wherein:

the lock pin has a longitudinal axis, the release pin has a longitudinal axis, and the axes of the lock pin and the release pin are oriented at an angle relative to each other.

10. The latch of claim 3, wherein:

the lock pin has a necked portion and the second surface of the base engages the necked portion of the lock pin to restrain the lock pin from moving towards the locked position when the lock pin is in the unlocked position.

11. The latch of claim 6, wherein:

the lock pin has a necked portion and the locking edge of the second surface engages the necked portion of the lock pin to restrain the lock pin from moving towards the locked position when the lock pin is in the unlocked position.

* * * * *